United States Patent
Law et al.

(10) Patent No.: US 10,009,852 B2
(45) Date of Patent: Jun. 26, 2018

(54) COLD TEMPERATURE POWER THROTTLING AT A MOBILE COMPUTING DEVICE

(71) Applicant: Apple Inc., Cupertino, CA (US)

(72) Inventors: Patrick Y. Law, Cupertino, CA (US); Keith Cox, Sunnyvale, CA (US); John M. Ananny, San Mateo, CA (US); Stephen D. Sterz, San Jose, CA (US); Derek J. DiCarlo, San Jose, CA (US); Gaurav Kapoor, Sunnyvale, CA (US); Jason L. Pang, Cupertino, CA (US); Alex J. Crumlin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/431,628

(22) Filed: Feb. 13, 2017

(65) Prior Publication Data
US 2017/0156111 A1 Jun. 1, 2017

Related U.S. Application Data

(63) Continuation of application No. 14/842,722, filed on Sep. 1, 2015, now Pat. No. 9,585,100.

(60) Provisional application No. 62/044,853, filed on Sep. 2, 2014.

(51) Int. Cl.
*H04W 52/02* (2009.01)
*H04L 12/26* (2006.01)
*H04B 1/3827* (2015.01)

(52) U.S. Cl.
CPC ........... *H04W 52/028* (2013.01); *H04L 43/16* (2013.01); *H04W 52/027* (2013.01); *H04W 52/0261* (2013.01); *H04W 52/0277* (2013.01); *H04W 52/0287* (2013.01); *H04B 1/385* (2013.01); *Y02B 60/50* (2013.01)

(58) Field of Classification Search
CPC ........... H04W 52/027; H04W 52/0287; H04W 52/0277
USPC ............. 455/127.1, 127.5, 574, 343.1, 343.5
See application file for complete search history.

(56) References Cited

U.S. PATENT DOCUMENTS

| | | | |
|---|---|---|---|
| 5,459,391 | A | 10/1995 | Amano |
| 5,519,303 | A | 5/1996 | Goedken et al. |
| 6,343,222 | B1 | 1/2002 | Jones |
| 7,425,814 | B2 | 9/2008 | Tsuchiya et al. |
| 7,446,508 | B2 | 11/2008 | Aradachi et al. |
| 7,863,866 | B2 | 1/2011 | Wolf |

(Continued)

*Primary Examiner* — Sonny Trinh
(74) *Attorney, Agent, or Firm* — Kilpatrick Townsend & Stockton

(57) ABSTRACT

The subject matter of the disclosure relates to low temperature power throttling at a mobile device to reduce the likelihood of an unexpected power down event in cold weather environments. A mobile device employing a power management solution may be configured to determine that a monitored temperature at the mobile device (at the battery of the mobile device) is below a first threshold level, and whether a hardware component (such as a camera) is active or inactive. Then, based on these determinations, the mobile device can select a throttle setting from a first set of throttle settings when the hardware component is active, and a second set of throttle settings when the hardware component is inactive. Subsequently the mobile device can throttle power consumption for one or more components of the mobile device according to the selected throttle setting.

20 Claims, 12 Drawing Sheets

(56) References Cited

U.S. PATENT DOCUMENTS

| | | | |
|---|---|---|---|
| 7,898,221 B2 | 3/2011 | Owens | |
| 7,956,582 B2 | 6/2011 | Wolf | |
| 8,237,413 B2 | 8/2012 | Gardes et al. | |
| 8,265,588 B2 | 9/2012 | Wells et al. | |
| 8,315,746 B2* | 11/2012 | Cox | G06F 1/203 |
| | | | 320/144 |
| 8,473,112 B2 | 6/2013 | Moriya | |
| 8,803,868 B2 | 8/2014 | Ferren et al. | |
| 9,462,623 B2* | 10/2016 | Jakusovszky | H04W 8/005 |
| 9,531,042 B2 | 12/2016 | Buford | |
| 9,585,100 B2 | 2/2017 | Law | |
| 9,866,057 B2 | 1/2018 | Pais et al. | |
| 2013/0021352 A1* | 1/2013 | Wyatt | G09G 5/395 |
| | | | 345/520 |
| 2013/0222959 A1* | 8/2013 | Sawyers | H02H 9/02 |
| | | | 361/93.8 |
| 2013/0259092 A1* | 10/2013 | Im | G01K 7/34 |
| | | | 374/184 |
| 2014/0324245 A1* | 10/2014 | Kwon | G06F 1/203 |
| | | | 700/299 |
| 2014/0327410 A1 | 11/2014 | Patel et al. | |
| 2014/0362889 A1* | 12/2014 | Jang | G01K 13/00 |
| | | | 374/152 |
| 2015/0245699 A1 | 9/2015 | Nishi et al. | |
| 2016/0037566 A1 | 2/2016 | Jakusovszky et al. | |
| 2016/0066266 A1 | 3/2016 | Law et al. | |

\* cited by examiner

Exemplary Power Throttling Scenario 1

| Temp. Range (°C) | Battery State of Charge (%) | | |
|---|---|---|---|
| | 0% to 50% | 50% to 75% | 75% to 100% |
| ≤ 5° C | Camera ON: BL 50%, P2, G2<br>Camera OFF: BL 75%, P1, G1 | Camera ON: BL 50%, P1, G1<br>Camera OFF: BL 90% | Camera ON: BL 90%<br>Camera OFF: No Throttling |
| 5° to 10° C | Camera ON: BL 75%, P1, G1<br>Camera OFF: BL 90% | Camera ON: BL 90%<br>Camera OFF: No Throttling | |
| ≥ 10° C | No Throttling | | |

*FIG. 3*

Exemplary Power Throttling Scenario 2

| Temp. Range (°C) | Battery State of Charge (%) | | |
|---|---|---|---|
| | 0% to 50% | 50% to 75% | 75% to 100% |
| ≤ 5° C | Camera ON: BL 50%, P2, G2<br>Camera OFF: BL 75%, P1, G1 | Camera ON: BL 50%, P1, G1<br>Camera OFF: BL 90% | Camera ON: BL 90%<br>Camera OFF: No Throttling |
| 5° to 10° C | Camera ON: BL 50%, P1, G1<br>Camera OFF: BL 90% | Camera ON: BL 90%<br>Camera OFF: No Throttling | |
| ≥ 10° C | No Throttling | | |

FIG. 4

Exemplary Power Throttling Scenario 3

| Temp. Range (°C) | Battery State of Charge (%) | |
| --- | --- | --- |
| | 0% to 75% | 75% to 100% |
| ≤ 5° C | Camera ON: BL 50%, P3, G2<br>Camera OFF: BL 75%, P1, G1 | Camera ON: BL 75%, P2, G1<br>Camera OFF: BL 90%, P0, G0 |
| 5° to 10° C | Camera ON: BL 75%, P2, G1<br>Camera OFF: BL 90%, P0, G0 | Camera ON: BL 90%, P1, G1<br>Camera OFF: No Throttling |
| ≥ 10° C | No Throttling | |

*FIG. 5*

Exemplary Power Throttling Scenario 4

| Temp. Range (°C) | Throttling |
|---|---|
| ≤ 5° C | Camera ON: BL 50%, P3, G2<br>Camera OFF: BL 75%, P1, G1 |
| 5° to 10° C | Camera ON: BL 75%, P2, G1<br>Camera OFF: BL 90%, P0, G0 |
| ≥ 10° C | No Throttling |

| Throttle Enable Voltage Level | Battery State of Charge (%) | | |
|---|---|---|---|
| Temp. Range (°C) | 0% to x% | x% to y% | y% to 100% |
| ≤ n | Voltage_1 | Voltage_2 | Voltage_3 |
| n to m | Voltage_4 | Voltage_5 | Voltage_6 |
| ≥ m | Voltage_7 | Voltage_8 | Voltage_9 |

| Throttle Enable Voltage Level | Battery State of Charge (%) | | | | | |
|---|---|---|---|---|---|---|
| Temp. Range (°C) | 0% to 5% | 5% to 25% | 25% to 50% | 50% to 75% | 75% to 90% | 90% to 100% |
| ≤ 5 | x1 V | x1 V | x1 V | x1 V | x3 V | x3 V |
| 5 to 10 | x1 V | x1 V | x1 V | x1 V | x3 V | x3 V |
| 10 to 15 | x1 V | x2 V | x3 V | x3 V | x3 V | x3 V |
| ≥ 15 | x2 V | x3 V | x3 V | x3 V | x3 V | x3 V |

*FIG. 10B*

COLD TEMPERATURE POWER THROTTLING AT A MOBILE COMPUTING DEVICE

RELATED APPLICATIONS

The present application is a continuation of, and claims benefit of, U.S. patent application Ser. No. 14/842,722, entitled "COLD TEMPERATURE POWER THROTTLING AT A MOBILE COMPUTING DEVICE" filed Sep. 1, 2015, which claims benefit of U.S. Provisional Application No. 62/044,853, entitled "COLD TEMPERATURE POWER THROTTLING AT A MOBILE COMPUTING DEVICE" filed Sep. 2, 2014; the contents of both of the above are incorporated herein by reference.

FIELD

The described embodiments generally relate to device performance management while a device is operating in low temperature environments. More specifically, the disclosure is directed to power management techniques for preventing a mobile device from experiencing unwanted shutdown events at extreme, cold temperatures.

BACKGROUND

Mobile computing devices are becoming increasingly popular in modern society. As device manufacturers are now making millions of mobile computing devices, there is increasing demand for devices with improved performance and features. Battery performance is one area that may limit device performance. Batteries convert chemical energy into electrical energy to power a mobile device in various operational modes. A battery is typically designed to have a particular power, voltage, and current rating that relate to a capacity of the battery for supplying charge to a mobile device during use. By way of example, lithium-ion batteries are popular amongst device manufactures due to their high energy density and low rate of self-discharge. However, the terminal voltage of a lithium-ion battery type typically varies during discharge, due in part to its physical and chemical characteristics.

Large and/or sudden changes to the terminal voltage of a battery may result in an unexpected power down of a mobile device. For example, if the battery terminal voltage drops below the minimum operating voltage of a mobile device (or a subsystem thereof), the mobile device may lose power (or the subsystem may brown out). The change in battery terminal voltage may be dependent upon the impedance of the battery as well as the load current drawn from the battery. Specifically, the likelihood of a shutdown occurring for a given load increases as the impedance of the battery increases. The impedance of a battery is dependent upon a number of factors, such as the battery's size, chemical properties, age, temperature, discharge current, etc. Accordingly, what is needed is a power management solution that can monitor power system performance at a mobile device and reduce unexpected power down events.

SUMMARY

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

Various embodiments disclosed herein provide for power management procedures that are executed at a mobile device to decrease the likelihood of unexpected shut down events. In some implementations, a procedure for carrying out this objective may include, measuring/monitoring a temperature at the mobile device using a temperature sensor (e.g., to determine a temperature at a battery of the mobile device), determining that the monitored temperature is below a first threshold level, and determining whether a hardware component (e.g., a camera or any power consuming component) of the mobile device is active or inactive. In response on these determinations, the procedure may further include, the mobile device selecting a throttle setting based on the monitored temperature, where the throttle setting is selected from a first set of throttle settings when the hardware component is active, and a second set of throttle settings when the hardware component is inactive, and then throttling power consumption of the mobile device according to the selected throttle setting.

In some aspects, selecting a throttle setting comprises setting a performance limit to one or more of a backlight, a central processing unit (CPU), and a graphics processing unit (GPU) of the mobile device. Further, power may be throttled for the backlight before power is throttled for the CPU or the GPU, and power may be throttled for the CPU before power is throttled for the GPU.

In some configurations, the power may be throttled for the backlight such that the backlight operates at one of a plurality of reduced brightness levels, power may be throttled for the CPU such that CPU operates at one of a plurality of predefined performance states (e.g., associated with different processing speeds), and power may be throttled for the GPU such that the GPU operates at one of a plurality of predefined performance states (e.g., associated with different processing speeds).

In various other aspects, selecting the throttle setting may further be based on a charge level of a battery of the mobile device or a battery cycle count of the battery.

BRIEF DESCRIPTION OF THE DRAWINGS

The described embodiments, and the attendant advantages thereof, may best be understood by referencing the corresponding description for the figures identified below, in conjunction with the illustrations in the accompanying drawings. The subject matter depicted in the drawings, is included solely for illustrative purposes, and is in no way intended to overly limit the scope or meaning of this disclosure. As such, it should be understood that various changes in form and detail can be made to the drawings, as would be anticipated by those having ordinary skill in the art, and such modification would not depart from the spirit and scope of the corresponding disclosure.

FIG. 3 illustrates a first exemplary power throttling scenario, in accordance with some embodiments of the disclosure.

FIG. 4 depicts a second exemplary power throttling scenario, in accordance with various embodiments of the disclosure.

FIG. 5 illustrates a third exemplary power throttling scenario, in accordance with some embodiments of the disclosure.

FIG. 6 depicts a fourth exemplary power throttling scenario, in accordance with various embodiments of the disclosure.

FIGS. 10A and 10B illustrate tables corresponding to throttle enable voltage levels for certain temperatures ranges of a battery and state of charge of a battery.

DETAILED DESCRIPTION

Figure 1:
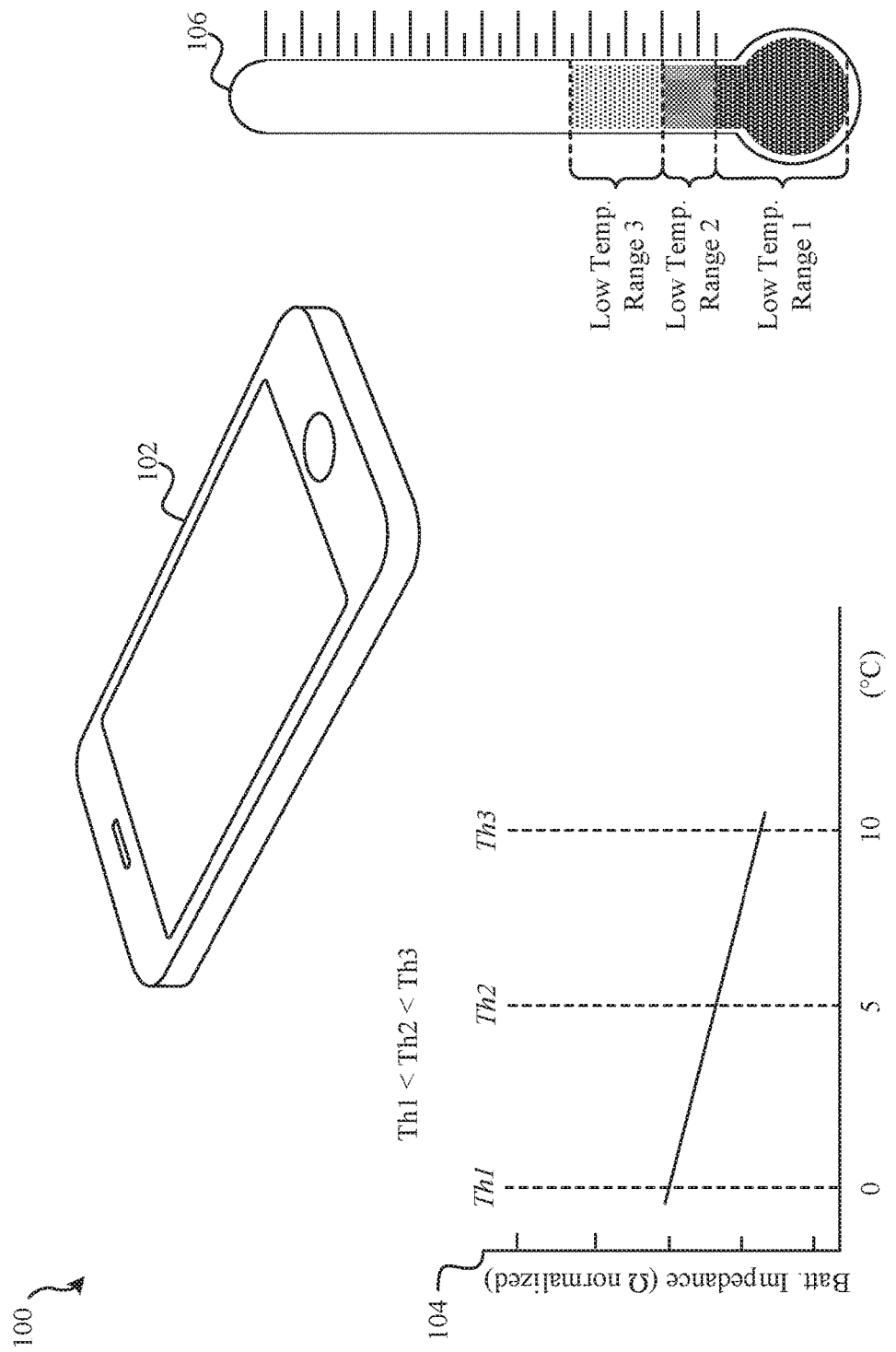
FIG. 1 illustrates a pictorial representation of a mobile device's battery impedance at varying low temperatures, in accordance with some embodiments of the disclosure.

Representative examples of performing power management operations at a mobile computing device that is exposed to low temperature environments are described within this section. Additionally, various examples of selectively throttling power to one or more device hardware components are also described herein. These examples are provided to add context to, and to aid in the understanding of, the cumulative subject matter of this disclosure. It should be apparent to one having ordinary skill in the art that the present disclosure may be practiced with or without some of the specific details described herein. Further, various modifications or alterations can be made to the subject matter described herein, and illustrated in the corresponding figures, to achieve similar advantages and results, without departing from the spirit and scope of the disclosure.

References are made in this section to the accompanying figures, which form a part of the disclosure and in which are shown, by way of illustration, various implementations corresponding to the described embodiments herein. Although the embodiments and scenarios of this disclosure are described in sufficient detail to enable one having ordinary skill in the art to practice the described implementations, it should be understood that these examples are not to be construed as being overly-limiting or all-inclusive.

In some embodiments, power throttling procedures can be executed at a mobile device to reduce unexpected device power down events, resulting from increased battery impedance at low device operating temperatures. These low device operating temperatures can be encountered when a mobile device is located in a geographic area having cold weather that is near or below the freezing point of water (e.g., at 0° Celsius). The mobile device can be configured to monitor a temperature, and can be configured to throttle power consumption of the mobile device, or components thereof, when the monitored temperature is below a particular temperature threshold. In some scenarios, the mobile device can be configured to measure/monitor temperature at the mobile device using a temperature sensor. The measured/monitored temperature may reflect the temperature of the battery, such that low temperature readings are indicative of increased battery impedance for the battery of the mobile device. For example, in some variations, the mobile device may be configured to directly measure a temperature of the battery using a temperature sensor. In some of these variations, the mobile device may comprise a gas-gauge circuit (also referred to as a fuel-gauge circuit) that can measure battery temperature.

When the monitored temperature is below the temperature threshold, the mobile device may select and apply a throttle setting to the mobile device. The selection of the throttle setting may be based on one or more of: the monitored temperature, the state of charge (SoC) of the battery, a battery cycle count of the battery, etc. Generally, the throttle setting may comprise a performance limit for one or more components of the mobile device. In this regard, it should be understood use of the term 'throttling," herein, may refer to an upper limit for performance and power consumption, and a mobile device may be configured to exceed this limit in a variety of non-related operational scenarios. In one implementation, a throttle setting may comprise performance limits for one or more of a backlight, a central processing unit (CPU), and a graphics processing unit (GPU) of the mobile device (e.g., in accordance with various hardware-based throttling priorities). Further, in some embodiments described herein, the mobile device can decide to perform additional power throttling operations (i.e., select a more power-restrictive throttle setting) when the mobile device identifies that a hardware component of the device, such as a camera, is active.

FIG. 1 depicts an illustrative example of a mobile device 102 as described herein, and a pictorial representation 100 of the mobile device's 102 battery impedance at varying low temperatures, in accordance with some embodiments of the disclosure. It should be understood that although the mobile device 102 is depicted in FIG. 1 as a cellular phone device, the mobile device 102 may also be representative of any other type of mobile computing device, such as (but not limited to) a laptop computer, a tablet computer, a music player, a mixed-media playback device, a wearable device or monitor, a mobile hotspot device, a health monitoring device, etc., without departing from the spirit and scope of the disclosure. Further, various components that may be incorporated into the mobile device 102 are depicted in more detail in FIG. 2, and are correspondingly described further herein, within the remaining disclosure.

Graph 104 of FIG. 1 depicts a normalized (e.g., with respect to an impedance metric, in Ohms Ω) graph 104 showing an example of how device battery impedance may vary versus battery temperature (e.g., in degrees Celsius), which is presented to emphasize the increasing effect of cold temperature on battery state and/or function. Generally, battery impedance increases as the battery/device temperature decreases toward cold temperatures. In some instances, battery impedance can increase as battery/device temperature progresses downward towards extreme, cold temperatures. Although a battery element is not depicted in FIG. 1, it should be appreciated that the battery impedance and temperature relationship depicted in the normalized graph 104 of FIG. 1 may be representative of a variety of common types of batteries without departing from the spirit and scope of the disclosure.

In various scenarios, a battery of a mobile device 102 may be located within a geographic climate where the device is exposed to temperatures ranging near or at the freezing point of water (e.g., at 0° C., or above/below). By way of example, a thermometer 106 having a normalized Celsius temperature scale is illustrated in FIG. 1 to show various low temperature ranges (e.g., low temp. ranges 1-3) to which the mobile device 102 may be subjected during use of the mobile device 102. In this regard, a first low temperature range may correspond to temperatures less than 0° C., a second low temperature range may be associated with temperatures less than 5° C. and greater than or equal to 0° C., and a third low temperature range associated with temperatures greater than or equal to 5° C. and less than 10° C. These three low temperature ranges can have significantly different effects on device battery impedance, due to the trending of impedance discussed above, with respect to the normalized graph 104 of FIG. 1.

Accordingly, in various configurations, described further herein, the effect of low temperature at a mobile device's battery can be delineated by various temperature thresholds that are based on these, or alternative, low temperature ranges. However, it should be understood that the temperature values and ranges recited above are purely exemplary in nature, and as such, the values assigned for the temperature ranges can vary widely depending on device battery characteristics and performance, as realized from the perspective of an active mobile device. Accordingly, varying thresholds may be employed based on such deviation. By way of example, multiple temperature thresholds (e.g., Th1, Th2, and Th3, where Th1<Th2<Th3) are shown in the normalized graph 104 corresponding to 0° C., 5° C., and 10° C. demarcation points that respectively border the three temperature ranges discussed above. In other instances, there may be a single temperature threshold, two temperature thresholds, or three or more temperature thresholds, without departing from the spirit and scope of the disclosure.

Figure 2:
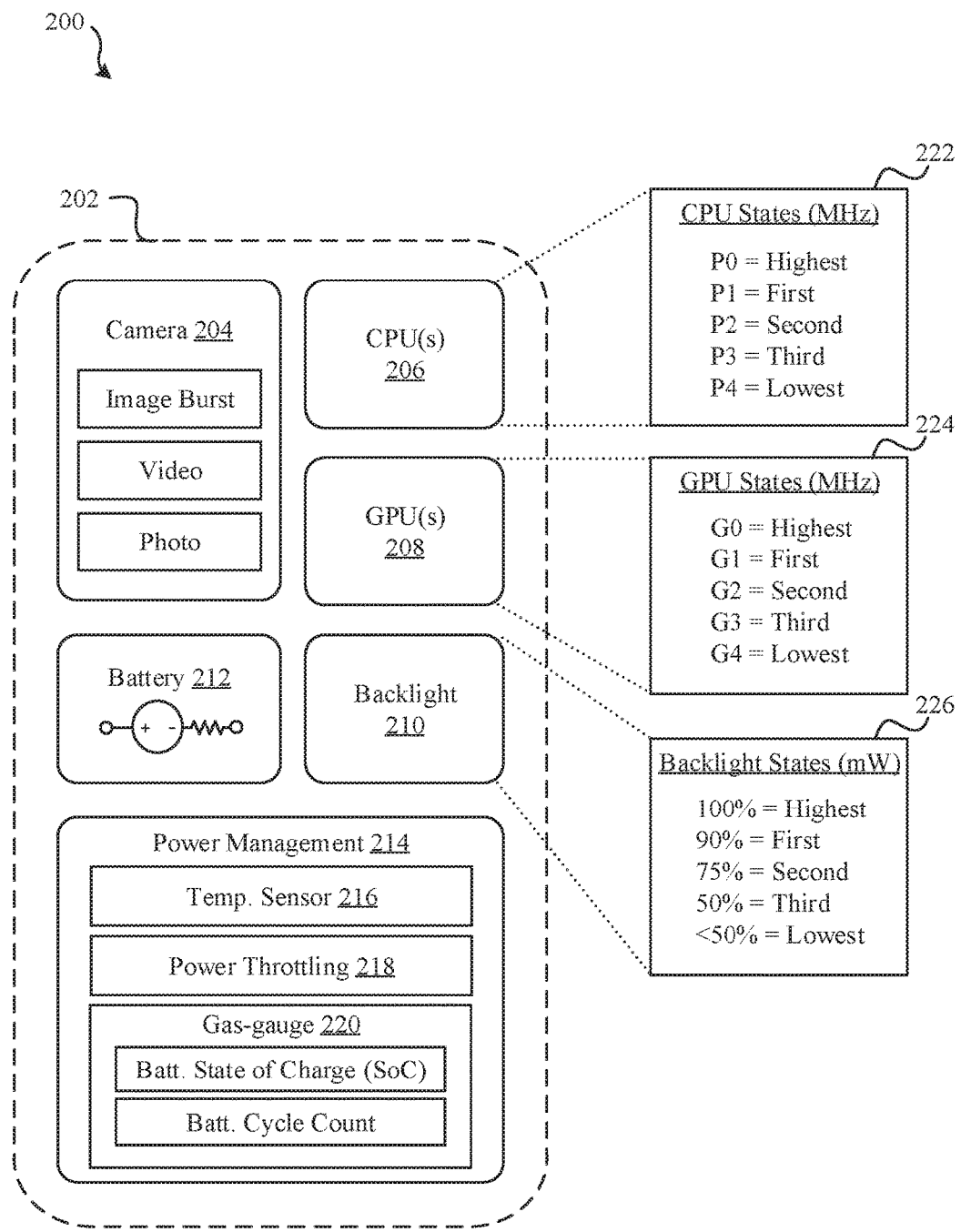
FIG. 2 depicts a block diagram of a computing device having a power management component that is configured to control various central processing unit (CPU), graphics processing unit (GPU), and backlight operational states, in accordance with various embodiments of the disclosure.

FIG. 2 depicts a block diagram 200 of a mobile device 202 having a power management component 214 that is configured to control a quantity of power (e.g., a charge) supplied to various power-consuming hardware components of the mobile device (e.g., CPU 206, GPU 208, and backlight 210), in accordance with various embodiments of the disclosure. Further, the mobile device can include a battery 212 (which is modeled in FIG. 2 as a DC voltage source in series with a resister (e.g., to represent impedance). It should be appreciated that the battery 212 may include any number of battery cells, which in turn may be connected in a parallel and/or series arrangement. In some instances, the mobile device 202 may include one or more hardware components (e.g., a camera, speakers, radio modems and transceivers, or the like), which may affect the power consumption of the mobile device 202 depending on whether the corresponding hardware component is active or inactive.

For example, in FIG. 2, the mobile device 202 is shown as comprising a camera 204 component (e.g., a backward and/or a forward facing camera). The camera 204 may function in one or more operational modes having varying power consumption characteristics. In some instances, the camera 204 may operate in multiple, different operational modes, including, but not limited to including: an image burst mode, a video mode, and a photo mode (e.g., a still image capture mode). Each of these camera 204 operational modes may have a distinct power consumption requirement of the battery 212 that uniquely affects the battery's discharge rate.

In accordance with some implementations, the power management component 214 of the mobile device 202 can monitor a temperature at the mobile device (e.g., a temperature experienced by the battery 212, affecting battery impedance) periodically, in accordance with a temperature measurement schedule that may be provided by a device manufacturer. Accordingly, the mobile device 202 may comprise one or more temperature sensors 216 to perform this function. Further, the power management component 214 may include a gas-gauge circuit 220 having a battery cycle count determination component for determining a battery cycle count corresponding to a number of times the battery 212 has been charged/discharged. Because the impedance of the battery 212 typically increases with battery cycle count, the battery cycle count may affect the throttle settings applied by the power throttling component 218 power management component 214. For example, the power throttling component 218 may be configured to apply more stringent throttling as the battery cycle count increases.

In some embodiments, the gas gauge circuit 220 of the power management component 214 may additionally include a battery SoC component that can periodically measure or otherwise calculate the battery's 212 present SoC (e.g., a percentage value of remaining battery charge). In some of these instances, the throttle settings (e.g., the performance limits to one or more of the backlight 210, the CPU 206, and the GPU 208 of the mobile device 202) may be based at least in part on the current SoC of the battery. For example, the power throttling component 218 of the power management component 214 may apply more stringent throttle settings (e.g., to reduce power consumption of the backlight 210, the CPU 206, and/or the GPU 208 of the mobile device 202) as the SoC of the battery decreases, which can be monitored by the gas-gauge circuit 220.

As described above, the power management component 214 may appropriately select one or more throttle settings for the mobile device (e.g., using the power throttling component 218) to throttle power consumption by mobile device 202, or components thereof, according to the selected throttle setting. In some embodiments, a selected throttle setting may comprise performance limits for one or more components of the mobile device 202. For example, the hardware components of the mobile device 202 may include one or more of the backlight 210, the CPU 206, or the GPU 208. As illustrated in FIG. 2, each of these components may include multiple performance states, where each performance state is associated with a different power consumption level for that particular hardware component. For example, the CPU 206 is depicted in FIG. 2 as having five CPU states 222 (e.g., CPU states P0 through P4), the GPU 208 is shown as having five GPU states 224 (e.g., GPU states G0 through G4), and the backlight 210 is depicted as having various backlight illumination states 226 (e.g., ranging from 100% brightness to <50% brightness), although it should be appreciated that each of these components may have any suitable number of performance states, without departing from the spirit and scope of the disclosure.

In some embodiments, the CPU 206 and/or the GPU 208 can incorporate a throttler with one or more internal dividers that can reduce clock speeds of the CPU 206 and/or GPU 208 when the throttler is enabled. Furthermore, the CPU states 222 and the GPU states 224 can depend on whether the throttler of the CPU 206 and/or GPU 208 is enabled. For example, a CPU 206 and/or GPU 208 can transition into a lower power state when the throttler is enabled. As a result of a throttler being enabled, clock speed(s) of the CPU 206 and/or GPU 208 can be reduced, which can also reduce the power consumption of the CPU 206 and/or GPU 208. The enabling of the throttler of the CPU 206 and/or GPU 208 can be based at least in part on any of a measured temperature at the mobile device 202, a current SoC of the battery 212, battery voltage, a determined or calculated battery impedance value, or any other suitable metric or combination thereof, as discussed herein. Furthermore, other components of the mobile device 202 can be throttled when the throttler of the CPU 206 and/or GPU 208 is enabled, such as the backlight 210, camera 204, haptic feedback device, speaker device, wireless transceiver (e.g., Wi-Fi transmitter, Bluetooth transmitter, cellular transmitter, near field communication (NFC) transmitter)), vibrating device, or any other component of the mobile device 202, as discussed herein. Furthermore, a wireless transceiver of the mobile device 202 can be throttled in isolation or when throttling other components according to any of the throttling scenarios discussed herein. For example, one or more wireless transceivers of the mobile device 202 can be throttled by temporary disabling a wireless transceiver, limiting an amount of power at which the wireless transceiver can transmit signals, and/or cause the wireless transceiver output blank transmissions for a period of time. Additionally, applications and background processes can also be throttled according to any of the throttling scenarios discussed herein. For example, background activities related to fetching mail and updating applications can be limited or stopped based on any of the throttling scenarios discussed herein.

In some configurations, a corresponding performance limit set for a component of the mobile device 202 (e.g., the backlight 210, the CPU 206, or the GPU 208) by the selected throttle setting may be the highest performance state in which that component is allowed to operate. In one example, a throttle setting may set the P1 performance state as the performance limit for the CPU 206, the G2 performance state as the performance limit for the GPU 208, and the 75% brightness performance state as the performance limit for the backlight 210. In these instances, the power management component 214 may throttle the CPU 206 from operating above the P1 performance state, throttle the GPU 208 from operating above the G2 performance state, and throttle the backlight 210 from operating above the 75% brightness performance state.

The selection of a throttle setting may be based at least in part on any of a measured temperature at the mobile device 202, a current SoC of the battery 212, a determined or calculated battery impedance value, a battery cycle count, or the like. In various scenarios, one or more of these values can be employed to enable the power throttling component 218 of the power management component 214 to determine when (e.g., when a particular threshold has been exceeded, or otherwise breached) and how to throttle power to the backlight 210, the CPU 206 and/or the GPU 208, such as, based on the measured temperature, the battery SoC, and/or the battery cycle count of the mobile device 202.

Additionally, the selection of a throttle setting may be based on a determination of whether a hardware component (e.g., a camera, speaker, a radio modem and transceiver, or the like) is active or inactive. For example, the choice of throttle setting may be different if a hardware component is active versus being inactive. For instance, the throttle setting may be selected from a first set of throttle settings when the hardware component is active and may be selected from a second set of throttle settings when the hardware component is inactive. In some instances where the hardware component is operable in multiple operating modes, the choice of throttle setting may further be based on the current operating mode of the hardware component. By way of example, in instances where the mobile device comprises a camera 204, the mobile device 202 may select a different throttle setting when the camera 204 is active than a throttle setting selected when the camera 204 is inactive. In some instances, the power management component 214 of the mobile device 202 may select a more stringent throttle setting when the camera 204 is active. Additionally or alternatively, the mobile device 202 may select a throttle setting configured to prioritize camera 204 performance when the camera is active and in a particular operating state (e.g., an image burst mode, a video mode, and a photo mode).

In some configurations, the mobile device 202 may include processing circuitry associated with the CPU 206 and/or GPU 208 that can perform power management and imaging functions at the mobile device 202, in accordance with one or more embodiments disclosed herein. In this regard, the processing circuitry can be configured to perform and/or control performance of one or more functionalities of the mobile device 202 in accordance with various embodiments, and thus, the processing circuitry can perform power throttling functions in collaboration with the power management component 214 in accordance with various implementations of the disclosure. The processing circuitry may further be configured to perform data processing, application execution and/or other control and management functions according to one or more embodiments of the disclosure.

Further, the mobile device 202, or portions or components thereof, such as the processing circuitry associated with the CPU 206 and/or GPU 208, may also include one or more chipsets that can respectively include any number of coupled microchips thereon. The processing circuitry and/or one or more other hardware components of the mobile device 202 (e.g., the camera 204, the backlight 210, the battery 212, etc.) may also be configured to implement functions associated with power management/throttling and imaging using its multiple chipsets.

In some configurations, the processing circuitry of the mobile device 202 may include one or more processor(s) (e.g., the CPU 206 and the GPU 208) and a memory or device storage component (not shown). Further, the processing circuitry may be in communication with, or otherwise coupled to, a radio frequency (RF) circuit (not shown) having a modem and one or more wireless communication transceivers. In various implementations, the RF circuit, including the modem and the one or more transceivers, may be configured to communicate using different wireless communication technology types. For instance, in some embodiments the RF circuit may be configured to communicate using various 4G, 3G, or 2G cellular communication technologies, WiMAX or Wi-Fi communication technologies, Bluetooth communication technologies, etc., without departing from the spirit and scope of the disclosure.

In various implementations, the processor(s) (e.g., the CPU 206 and the GPU 208) may be configured and/or employed in a variety of different forms. For example, the processor(s) may be associated with any number of microprocessors, co-processors, controllers, or various other computing or processing implements, including integrated circuits such as, for example, an application specific integrated circuit (ASIC), a field programmable gate array (FPGA), or any combination thereof. In various arrangements, multiple processors can be coupled to and/or configured in operative communication with each other, and these hardware components may be collectively configured to perform one or more procedures of the mobile device 202 as described herein, in the form of a multi-mode wireless communication device.

In some scenarios, the processor(s) (e.g., the CPU 206 and the GPU 208) can be configured to execute instructions (e.g., computer-executable instructions) that may be stored in the memory of the mobile device 202, or that is otherwise accessible to the processor(s) at some other device storage location. As such, whether configured as, or in conjunction with, hardware or a combination of hardware and software, the processor(s) of the processing circuitry may be capable of performing power management (including power throttling) operations according to various embodiments described herein, when configured accordingly.

In some implementations, the memory of the processing circuitry may include multiple memory devices that can be associated with any common volatile or non-volatile memory type. In some scenarios, the memory may be associated with a non-transitory computer-readable storage medium that can store various computer program instructions which may be executed by the processor(s) (e.g., the CPU 206 and the GPU 208) during normal firmware or application executions. In this regard, the memory can be configured to store information, data, applications, instructions, or the like, for enabling the mobile device 202 to carry out various power throttling functions in accordance with one or more embodiments of the disclosure. In some configurations, the memory may be in communication with, and coupled to, the processor(s) of the processing circuitry, as well as to one or more system buses for passing information between and amongst the different device components of the mobile device 202.

It should be appreciated that not all of the components, device elements, and hardware illustrated in, and described with respect to, the mobile device 202 of FIG. 2 may be essential to this disclosure, and thus, some of these items may be omitted, consolidated, or otherwise modified within reason. Additionally, in some implementations, the subject matter associated with the mobile device 202 can be configured to include additional or substitute components, device elements, or hardware, beyond those that are shown within FIG. 2.

In one embodiment, a closed-loop implementation may be employed at the mobile device 202, where the battery 212 is configured to report to the power management component 214 how much power and/or current it is capable of delivering to its load at the mobile device 202 for a particular purpose (e.g., depending on what operations are being carried out at the mobile device 202). In some configurations, the reported power and/or current capability of the battery 212 may be based on computed or estimated battery impedance (e.g., a temperature derived impedance), battery terminal voltage, current being delivered to a load, known shutdown voltage, etc. In some embodiments, the power management component 214 can utilize the capability information received from the battery 212 to determine how to perform one or more throttling operations, as described further herein.

FIG. 3 illustrates a first exemplary power throttling scenario in a table 300 format, in accordance with some implementations of the disclosure. As shown within the table 300, power may be throttled (e.g., by the power throttling component 218 of the power management component 214) based on a plurality of temperature thresholds, battery SoC, and whether a camera is active or inactive. Specifically, in some embodiments, the temperature thresholds may include a first temperature threshold, at or above which throttling does not occur under this throttling mechanism (it should be appreciated, however, that throttling may occur under other throttling mechanisms not described herein). When the temperature is below the first threshold, the throttle settings may be selected at least in part on the measured temperature.

Further, the temperature thresholds may also include a second temperature threshold. In these embodiments, different throttle settings may be selected if the temperature is in a first low temperature range (e.g., temperatures between the first and second temperature threshold) than if the temperature is in a second low temperature range (e.g., at or below the second temperature threshold). The first temperature threshold is shown in FIG. 3 as 10° C. and the second temperature threshold is shown as 5° C., but it should be appreciated that the temperature thresholds may be any suitable values, and that any number of temperature thresholds may be used. It should be understood that these temperature ranges can have significantly different effects on battery impedance, as described above with respect to the normalized graph 104 of FIG. 1.

Further, the choice of throttle settings may be based on the SoC in the battery, and optionally the battery cycle count. For example, there may be a plurality of SoC ranges (shown in FIG. 3 as having a first SoC range, a second SoC range, and a third SoC range), wherein the selection of the throttle setting is dependent on which of the plurality of SoC ranges encompasses the current battery SoC. As an example, the first SoC range may correspond to a battery charge between 0 to 50%, the second SoC range may correspond to a battery charge between 50 to 75%, and the third SoC range may correspond to a battery charge between 75% to a 100%. Additionally, the choice of throttle setting may further be based on whether a hardware component (in the example of FIG. 3, a camera) is active or inactive. Specifically, different throttle settings may be selected when the hardware component is active versus when the hardware component is inactive.

In various embodiments, with respect to table 300, when a temperature measured by a temperature sensor 216 of the power management component 214 of a mobile device 202 is at or above the first temperature threshold (e.g., 10° C.), no power throttling will be performed. Further, when the temperature is within the first low temperature range and the battery SoC is in the third SoC range, no power throttling will be performed. However, when the temperature is within the first low temperature range and the battery SoC is in the second SoC range, power may be throttled when the camera 204 is active but not when the camera is inactive. When the camera 204 is active, a given throttle setting may be selected (in this example, the throttle setting may be performance limiting the backlight 210 to 90% brightness). In another configuration, within the first low temperature range and in the first SoC range, the mobile device 202 will select a first throttle setting when the camera 204 is active (e.g., the backlight 210 may be power throttled to 75% brightness, the CPU 206 may be power throttled to a first reduced performance state P1, and the GPU 208 may be power throttled to a first reduced performance state G1, simultaneously) or a second throttle setting when the camera is not active (e.g., the backlight 210 may be power throttled to 90% brightness).

Further, with respect to table 300, when a temperature measured by a temperature sensor 216 of the power management component 214 of a mobile device 202 is within or below the second low temperature range and the battery SoC is in the third SoC range, power may be throttled when the camera 204 is active, but not when the camera is inactive. When the camera 204 is active, a given throttle setting may be selected (in this example, the throttle setting may be performance limiting the backlight 210 to 90% brightness). In another configuration, within the second low temperature range and in the second SoC range, the mobile device 202 will select a first throttle setting when the camera 204 is active (e.g., the backlight 210 may be power throttled to 50% brightness, the CPU 206 may be power throttled to a first reduced performance state P1, and the GPU 208 may be power throttled to a first reduced performance state G1, simultaneously) or a second throttle setting when the camera is not active (e.g., the backlight 210 may be power throttled to 90% brightness). In another configuration, within the second low temperature range and in the first SoC range, the mobile device 202 will select a first throttle setting when the camera 204 is active (e.g., the backlight 210 may be power throttled to 50% brightness, the CPU 206 may be power throttled to a second reduced performance state P2, and the GPU 208 may be power throttled to a second reduced performance state G2, simultaneously) or a second throttle setting when the camera is not active (e.g., the backlight 210 may be power throttled to 75% brightness, the CPU 206 may be power throttled to a first reduced performance state P1, and the GPU 208 may be power throttled to a first reduced performance state G1, simultaneously).

FIG. 4 illustrates a second exemplary power throttling scenario in a table 400 format, in accordance with some implementations of the disclosure. It should be understood that the power throttling values employed (e.g., by the power management component 214) within table 400 of FIG. 4 mirror the power throttling values depicted in the power throttling scenario within table 300 of FIG. 3 (and so does the corresponding description), with one exception. This exception is depicted in bold within Table 400. Specifically, within the first low temperature range and in the first SoC range, the mobile device 202 will select a first throttle setting when the camera 204 is active (e.g., the backlight 210 may be power throttled to 50% brightness (which is lower than that depicted in Table 3, by 25%), the CPU 206 may be power throttled to a first reduced performance state P1, and the GPU 208 may be power throttled to a first reduced performance state G1, simultaneously) or a second throttle setting when the camera is not active (e.g., the backlight 210 may be power throttled to 90% brightness). In various implementations, the power management component 214 can employ this reduced backlight brightness of 50% to further prevent unwanted shutdown events for the mobile device within the first low temperature range.

FIG. 5 illustrates a third exemplary power throttling scenario in a table 500 format, in accordance with some implementations of the disclosure. As shown within the table 500, power may be throttled (e.g., by the power throttling component 218 of the power management component 214) based on a plurality of temperature thresholds, battery SoC, and whether a camera is active or inactive. Specifically, in some implementations, the temperature thresholds may include a first temperature threshold, at or above which throttling does not occur under this throttling mechanism (it should be appreciated, however, that throttling may occur under other throttling mechanisms not described herein). When the temperature is below the first threshold, the throttle settings may be selected at least in part on the measured temperature.

Further, the temperature thresholds may also include a second temperature threshold. In these embodiments, different throttle settings may be selected if the temperature is in a first low temperature range (e.g., temperatures between the first and second temperature threshold) than if the temperature is in a second low temperature range (e.g., at or below the second temperature threshold). The first temperature threshold is shown in FIG. 5 as 10° C. and the second temperature threshold is shown as 5° C., but it should be appreciated that the temperature thresholds may be any suitable values, and that any number of temperature thresholds may be used. It should be understood that these temperature ranges can have significantly different effects on battery impedance, as described above with respect to the normalized graph 104 of FIG. 1.

The choice of throttle settings may be based on the SoC in the battery, and optionally the battery cycle count. For example, there may be a plurality of SoC ranges (shown in FIG. 5 as having a first SoC range and a second SoC range), wherein the selection of the throttle setting is dependent on which of the plurality of SoC ranges encompasses the current battery SoC. As an example, the first SoC range may correspond to a battery charge between 0 to 75% and the second SoC range may correspond to a battery charge between 75% to 100%. Additionally, the choice of throttle setting may further be based on whether a hardware component (in the example of FIG. 5, a camera) is active or inactive. Specifically, different throttle settings may be selected when the hardware component is active versus when the hardware component is inactive.

In various embodiments, with respect to table 500, when a temperature measured by a temperature sensor 216 of the power management component 214 of a mobile device 202 is at or above the first temperature threshold (e.g., 10° C.), no power throttling will be performed. Further, when the temperature is within the first low temperature range and the battery SoC is in the second SoC range, power may be throttled when the camera 204 is active but not when the camera is inactive. When the camera 204 is active, a given throttle setting may be selected (in this example, the throttle setting may be performance limiting the backlight 210 to 90% brightness, the CPU 206 may be power throttled to a first reduced performance state P1, and the GPU 208 may be power throttled to a first reduced performance state G1). In another configuration, within the first low temperature range and in the first SoC range, the mobile device 202 will select a first throttle setting when the camera 204 is active (e.g., the backlight 210 may be power throttled to 75% brightness, the CPU 206 may be power throttled to a second reduced performance state P2, and the GPU 208 may be power throttled to a first reduced performance state G1, simultaneously) or a second throttle setting when the camera is not active (e.g., the backlight 210 may be power throttled to 90% brightness, the CPU 206 may be left unthrottled at the highest performance state P0, and the GPU 208 may be left unthrottled at the highest performance state G0, simultaneously).

Further, with respect to table 300, when a temperature measured by a temperature sensor 216 of the power management component 214 of a mobile device 202 is within or below the second low temperature range and the battery SoC is in the second SoC range, power may be throttled when the camera 204 is active as well as when the camera is inactive. When the camera 204 is active, a given throttle setting may be selected (in this example, the throttle setting may be performance limiting the backlight 210 to 75% brightness, the CPU 206 may be power throttled to a second reduced performance state P2, and the GPU 208 may be power throttled to a first reduced performance state G1, simultaneously). Alternatively, when the camera 204 is inactive, a given throttle setting may be selected (in this example, the throttle setting may be performance limiting the backlight 210 to 90% brightness, the CPU 206 may be left unthrottled at the highest performance state P0, and the GPU 208 may be left unthrottled at the highest performance state G0, simultaneously)

In another configuration, within the second low temperature range and in the first SoC range, the mobile device 202 will select a first throttle setting when the camera 204 is active (e.g., the backlight 210 may be power throttled to 50% brightness, the CPU 206 may be power throttled to a third reduced performance state P3, and the GPU 208 may be power throttled to a second reduced performance state G1, simultaneously), or a second throttle setting when the camera is not active (e.g., the backlight 210 may be power throttled to 75% brightness, the CPU 206 may be power throttled to a first reduced performance state P1, and the GPU 208 may be power throttled to a first reduced performance state G1, simultaneously).

FIG. 6 illustrates a fourth exemplary power throttling scenario in a table 600 format, in accordance with some implementations of the disclosure. As shown within the table 600, power may be throttled (e.g., by the power throttling component 218 of the power management component 214) based on a plurality of temperature thresholds and whether a camera is active or inactive. It should be understood that battery charge is not taken into consideration in the fourth exemplary power throttling scenario of table 600, as only temperature and component operating states differentiate the power throttling procedures. Specifically, in some implementations, the temperature thresholds may include a first temperature threshold, at or above which throttling does not occur under this throttling mechanism (it should be appreciated, however, that throttling may occur under other throttling mechanisms not described herein). When the temperature is below the first threshold, the throttle settings may be selected at least in part on the measured temperature.

Further, the temperature thresholds may also include a second temperature threshold. In these embodiments, different throttle settings may be selected if the temperature is in a first low temperature range (e.g., temperatures between the first and second temperature threshold) than if the temperature is in a second low temperature range (e.g., at or below the second temperature threshold). The first temperature threshold is shown in FIG. 6 as 10° C. and the second temperature threshold is shown as 5° C., but it should be appreciated that the temperature thresholds may be any suitable values, and that any number of temperature thresholds may be used. It should be understood that these temperature ranges can have significantly different effects on battery impedance, as described above with respect to the normalized graph 104 of FIG. 1. Further, the choice of throttle setting may be based on whether a hardware component (in the example of FIG. 6, a camera) is active or inactive. Specifically, different throttle settings may be selected when the hardware component is active versus when the hardware component is inactive.

In various embodiments, with respect to table 600, when a temperature measured by a temperature sensor 216 of the power management component 214 of a mobile device 202 is at or above the first temperature threshold (e.g., 10° C.), no power throttling will be performed. Further, when the temperature is within the first low temperature range and the camera 204 is active, a given throttle setting may be selected (in this example, the throttle setting may be performance limiting the backlight 210 to 75% brightness, the CPU 206 may be power throttled to a second reduced performance state P2, and the GPU 208 may be power throttled to a first reduced performance state G1, simultaneously). However, when the camera is not active within the first low temperature range, another throttle setting may be selected (in this example, the throttle setting may be performance limiting the backlight 210 to 90% brightness, the CPU 206 may be left unthrottled at the highest performance state P0, and the GPU 208 may be left unthrottled at the highest performance state G0, simultaneously).

In another configuration, within the second low temperature range when the camera 204 is active, a given throttle setting may be selected (in this example, the throttle setting may be performance limiting the backlight 210 to 50% brightness, the CPU 206 may be power throttled to a third reduced performance state P3, and the GPU 208 may be power throttled to a second reduced performance state G2, simultaneously). However, when the camera is not active within the second low temperature range, a different throttle setting may be selected (in this example, the throttle setting may be performance limiting the backlight 210 to 75% brightness, the CPU 206 may be power throttled to a first reduced performance state P1, and the GPU 208 may be power throttled to a first reduced performance state G1, simultaneously).

Figure 7:
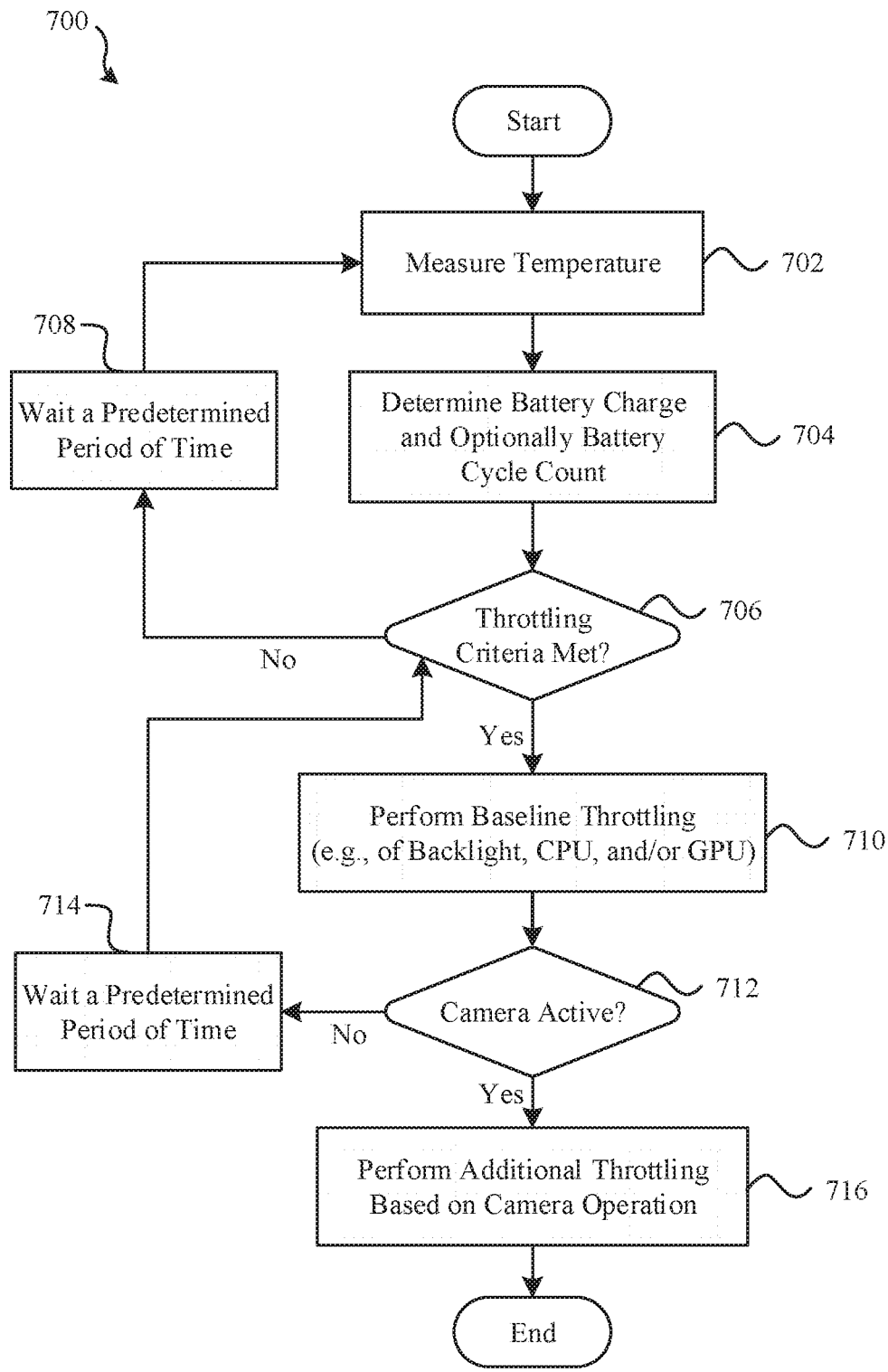
FIG. 7 depicts a flow diagram of a procedure for performing dual level power throttling, in accordance with various embodiments of the disclosure.

FIG. 7 depicts a flow diagram of a procedure 700 for performing dual level power throttling, in accordance with various embodiments of the disclosure. In this regard, it should be understood that any or all of the procedures 700 depicted in FIG. 7 may be associated with a method, or methods, that can be implemented by the execution of computer-executable instructions (e.g., computer program code) stored in a non-transitory computer-readable memory of a mobile device 202. Initially, at operation block 702, a mobile device 202 can utilize its temperature sensor 216 to measure a temperature at the mobile device. Then, at operation block 704, the mobile device 202 can determine the SoC of its battery 212 and optionally its battery cycle count (e.g., using its gas-gauge circuit 220). Thereafter, at decision block 706, the mobile device 202 can determine whether a baseline power management criteria (e.g., a throttling criteria) has been met using its power management component 214, based on the measured temperature and in some implementations the SoC of the battery 212, and optionally the battery cycle count.

In a scenario where it is determined that the baseline power management criteria (e.g., a throttling criteria) has not been met, at decision block 706, the mobile device 202 can wait a predetermined period of time, at operation block 708, before repeating the measurement process at operation block 702. However, when it is determined that the baseline power management criteria (e.g., a throttling criteria) has been met, at decision block 706, the mobile device 202 can employ the power throttling component 218 of its power management component 214 to perform a baseline throttling of power to one or more of its hardware components (e.g., the backlight 210, CPU 206, and/or GPU 208), as further described herein. This can involve applying a throttle setting comprising one or more performance limits for the backlight 210, CPU 206, and/or GPU 208 components of the mobile device 202, as described above.

Subsequently, at decision block 712, the mobile device 202 can determine whether its camera 204 is active (e.g., in an image burst, video, or photo mode), and when the camera 204 is actively consuming power of the battery 212. This camera state information may be considered to be a power throttling criteria, or alternatively, a power management criteria. In a scenario where it is determined that the camera 204 is not active, at decision block 712, the mobile device 202 can wait a predetermined period of time, at operation block 714, while still performing baseline power throttling, before returning to decision block 706. However, in a scenario where it is determined that the camera 204 is active, at decision block 712, the mobile device 202 can perform additional throttling (e.g., for the backlight 210, CPU 206, and/or GPU 208) based on a particular camera operation mode, at operation block 716, in addition to the baseline power throttling. This can process can apply a throttle setting comprising one or more performance limits for the backlight 210, CPU 206, and/or GPU 208 components of the mobile device 202, in a manner described previously.

Figure 8:
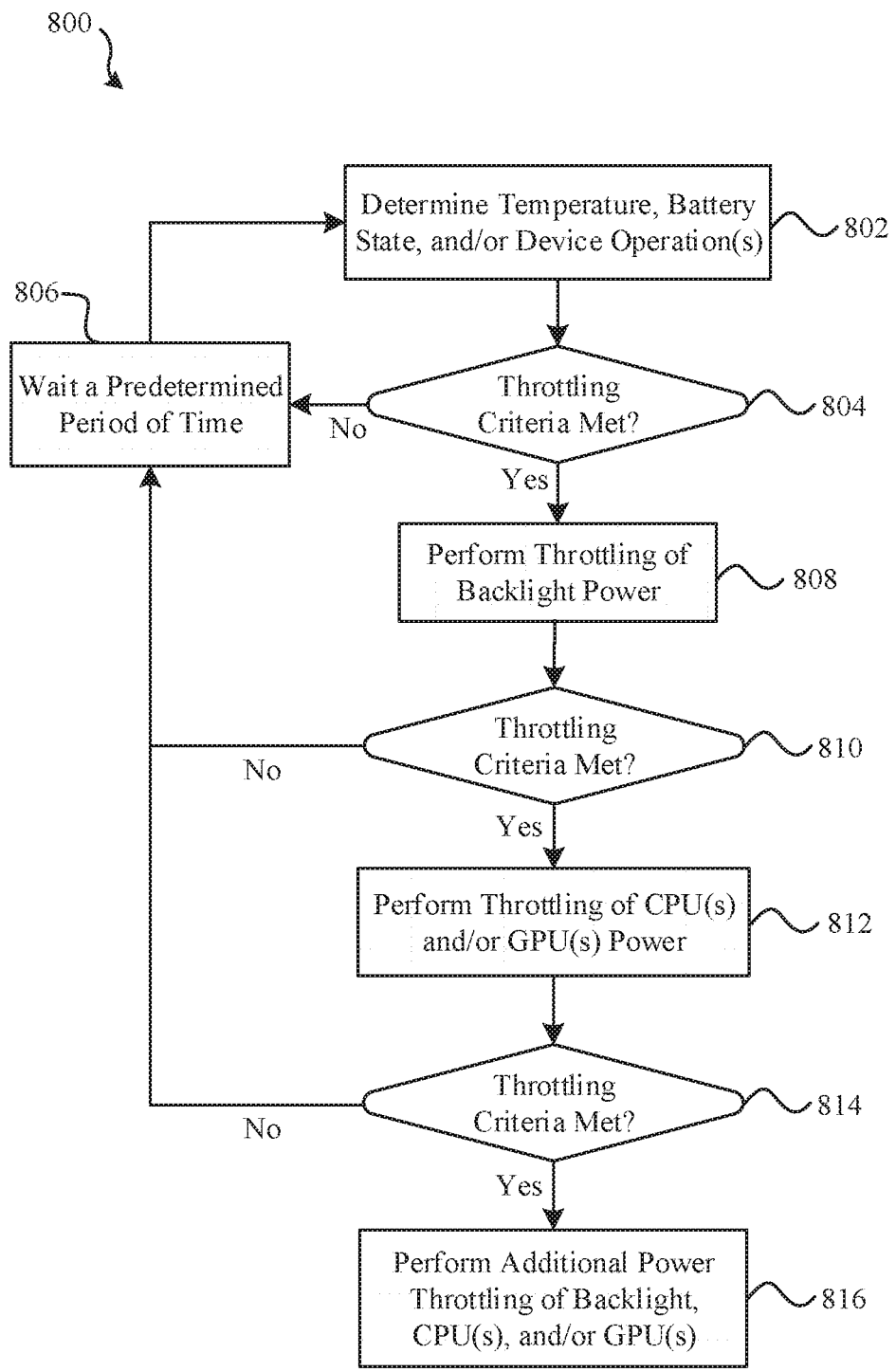
FIG. 8 illustrates a flow diagram of a procedure for performing selective power throttling at a mobile device, in accordance with some embodiments of the disclosure.

FIG. 8 illustrates a flow diagram of a procedure 800 for performing selective power throttling at a mobile device 202, in accordance with some embodiments of the disclosure. In this regard, it should be understood that any or all of the procedures 800 depicted in FIG. 8 may be associated with a method, or methods, that can be implemented by the execution of computer-executable instructions (e.g., computer program code) stored in a non-transitory computer-readable memory of a mobile device 202. Initially, at operation block 802, a mobile device 202 can utilize its temperature sensor 216 to measure a temperature at the mobile device 202, and its power management component 214 to determine its battery state (e.g., the SoC of its battery 212 and/or its battery cycle count) using its gas-gauge circuit 202, and what device operations (e.g., camera operations) are being performed.

Thereafter, at decision block 804, the mobile device 202 can determine whether a first throttling criteria has been met (e.g., when a temperature threshold value is exceeded by the measured temperature) using its power management component 214, based on the measured temperature, and optionally, the SoC and/or the battery cycle count. In a scenario where it is determined that the first throttling criteria has not been met, at decision block 804, the mobile device 202 can wait a predetermined period of time, at operation block 806, before repeating the measurement process at operation block 802. However, when it is determined that the first throttling criteria has been met, at decision block 804, the mobile device 202 can employ the power throttling component 218 of its power management component 214 to perform a throttling of power for its backlight 210, at operation block 808. In various configurations, this may involve applying a throttle setting comprising one or more performance limits for the backlight 210, CPU 206, and/or GPU 208 components of the mobile device 202, described above.

Next, at decision block 810, the mobile device 202 can determine whether a second throttling criteria has been met (e.g., when another temperature threshold value is exceeded) using its power management component 214, based on the measured temperature, and optionally, the SoC and/or the battery cycle count (e.g., as determined by the gas-gauge circuit 220). In a scenario where it is determined that the second throttling criteria has not been met, at decision block 810, the mobile device 202 can wait a predetermined period of time, at operation block 806, before repeating the measurement process at operation block 802. However, when it is determined that the second throttling criteria has been met, at decision block 810, the mobile device 202 can employ the power throttling component 218 of its power management component 214 to perform a throttling of power for its CPU 206 and/or GPU 208 components, at operation block 812. This can involve applying a throttle setting comprising one or more performance limits for the backlight 210, CPU 206, and/or GPU 208 components of the mobile device 202, as described further herein.

Thereafter, at decision block 814, the mobile device 202 can determine whether a third throttling criteria has been met (e.g., when another temperature threshold value is exceeded by the measured temperature) using its power management component 214, based on the measured temperature, and optionally, the SoC and/or the battery cycle count. In a scenario where it is determined that the third throttling criteria has not been met, at decision block 814, the mobile device 202 can wait a predetermined period of time, at operation block 806, before repeating the measurement process at operation block 802. However, when it is determined that the third throttling criteria has been met, at decision block 810, the mobile device 202 can employ the power throttling component 218 of its power management component 214 to perform additional throttling of power for its backlight 210, CPU 206, and/or GPU 208 components, at operation block 816. This can involve applying a throttle setting comprising one or more performance limits for the backlight 210, CPU 206, and/or GPU 208 components of the mobile device 202, in a manner described above.

Figure 9:
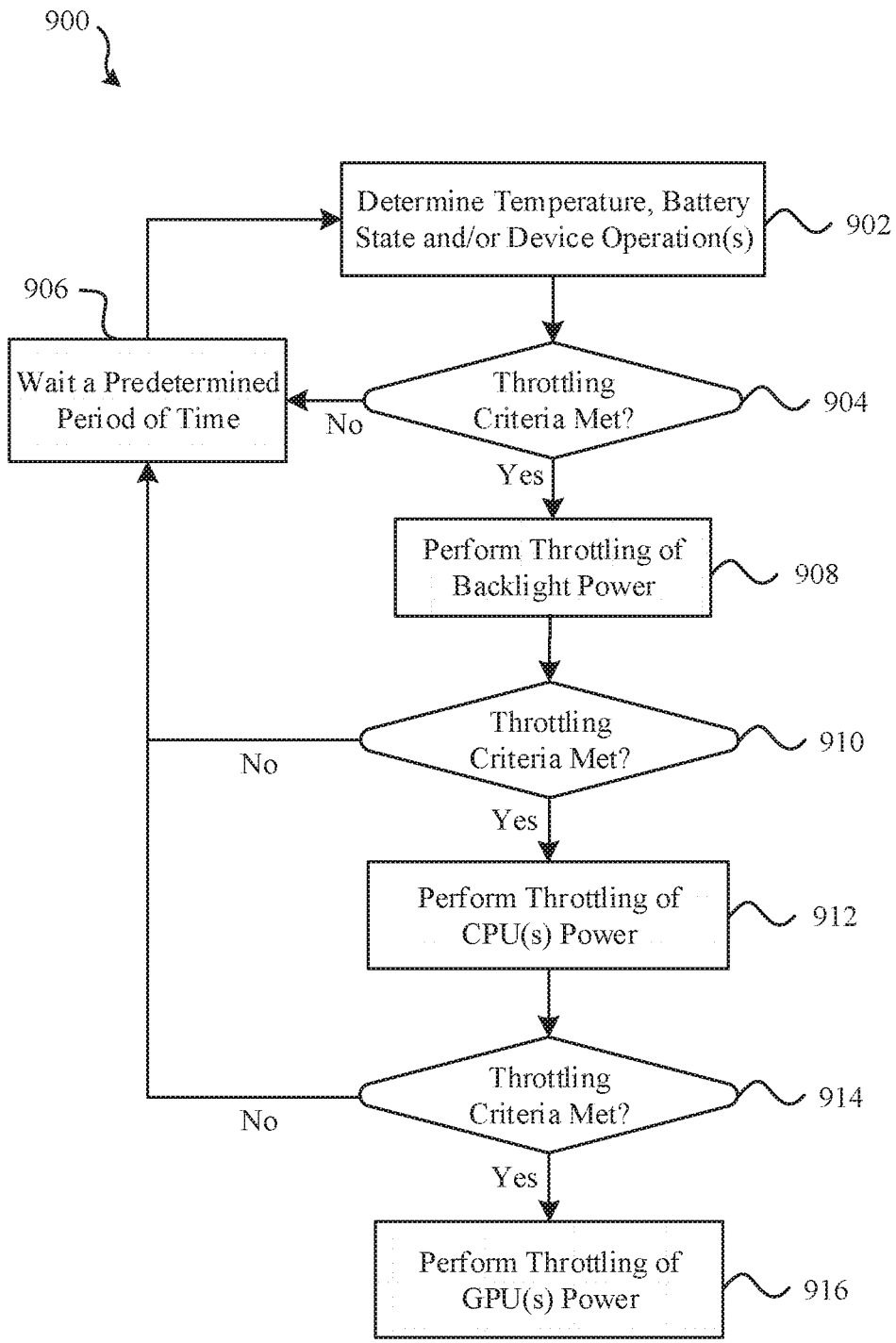
FIG. 9 depicts a flow diagram of another procedure for performing selective power throttling at a mobile device, in accordance with various embodiments of the disclosure.

FIG. 9 depicts a flow diagram of another procedure 900 for performing selective power throttling at a mobile device 202, in accordance with various embodiments of the disclosure. In this regard, it should be understood that any or all of the procedures 900 depicted in FIG. 9 may be associated with a method, or methods, that can be implemented by the execution of computer-executable instructions (e.g., computer program code) stored in a non-transitory computer-readable memory of a mobile device 202. Initially, at operation block 902, a mobile device 202 can utilize its temperature sensor 216 to measure a temperature at the mobile device 202, and its power management component 214 to determine its battery state (e.g., the SoC of its battery 212 and/or its battery cycle count), and what device operations (e.g., camera operations) are being performed.

Subsequently, at decision block 904, the mobile device 202 can determine whether a first throttling criteria has been met (e.g., when a temperature threshold value is exceeded by the measured temperature) using its power management component 214, based on the measured temperature, and optionally, the SoC and/or the battery cycle count. In a scenario where it is determined that the first throttling criteria has not been met, at decision block 904, the mobile device 202 can wait a predetermined period of time, at operation block 906, before repeating the measurement process at operation block 902. However, when it is determined that the first throttling criteria has been met, at decision block 904, the mobile device 202 can employ the power throttling component 218 of its power management component 214 to perform a throttling of power for its backlight 210, at operation block 908. In this regard, a throttle setting comprising one or more performance limits for the backlight 210, CPU 206, and/or GPU 208 components of the mobile device 202 can be applied.

Next, at decision block 910, the mobile device 202 can determine whether a second throttling criteria has been met (e.g., when another temperature threshold value is exceeded) using its power management component 214, based on the measured temperature, and optionally, the SoC and/or the battery cycle count. In a scenario where it is determined that the second throttling criteria has not been met, at decision block 910, the mobile device 202 can wait a predetermined period of time, at operation block 906, before repeating the measurement process at operation block 902. However, when it is determined that the second throttling criteria has been met, at decision block 910, the mobile device 202 can employ the power throttling component 218 of its power management component 214 to perform a throttling of power for its CPU 206 component, at operation block 912. This can involve applying a throttle setting comprising one or more performance limits for the backlight 210, CPU 206, and/or GPU 208 components of the mobile device 202, as previously discussed.

Thereafter, at decision block 914, the mobile device 202 can determine whether a third throttling criteria has been met (e.g., when another temperature threshold values is exceeded) using its power management component 214, based on the measured temperature, and optionally, the SoC and/or the battery cycle count (e.g., as determined by the gas-gauge circuit 220). In a scenario where it is determined that the third throttling criteria has not been met, at decision block 914, the mobile device 202 can wait a predetermined period of time, at operation block 906, before repeating the measurement process at operation block 902. However, when it is determined that the third throttling criteria has been met, at decision block 910, the mobile device 202 can employ the power throttling component 218 of its power management component 214 to perform a throttling of power for its GPU 208 component, at operation block 916. This may involve applying a throttle setting comprising one or more performance limits for the backlight 210, CPU 206, and/or GPU 208 components of the mobile device 202, described above.

FIGS. 10A and 10B illustrate tables corresponding to throttle enable voltage levels for certain temperatures ranges of a battery and/or state of charge of the battery. The throttle enable voltage levels correspond to thresholds that are used to trigger the throttling of the CPU 206 and/or GPU 208, or any other subsystem of the mobile device 202 with a voltage based throttler. Specifically, the throttle enable voltage levels can correspond to thresholds for a battery voltage, or any voltage derived from the battery voltage. Each of the throttle enable voltage levels can be based on temperature and state of charge to protect the mobile device 202 against unexpected or accidental shutdowns. Furthermore, the throttler enable voltage levels can apply to multiple subsystems (i.e., CPU 206, GPU 208, haptic feedback device, speaker, and/or other component of the mobile device 202), and can be adjusted to establish throttling priority levels for the subsystems. For example, a first subsystem can be set to throttle at a first voltage level of a battery, and a second subsystem can be set to throttle at a second voltage level of a battery that is less than the first voltage level. In this way, as battery voltage decreases, the first subsystem will throttle before the second subsystem throttles. This can be applied to any number of subsystems in order to establish an order or priority by which the subsystems are throttled.

In order to implement table 1000 or table 1002, the mobile device 202 can include a voltage based throttler that throttles the CPU 206, GPU 208, and/or any other power consuming component of the mobile device 202 according to the table 1000 or table 1002. For example, when a state of charge of the battery 212 is between 0% and x %, where x is any real number between 0 and 100, the throttle enable voltage level can be set to either Voltage_1, Voltage_4, or Voltage_7 depending on the temperature of the battery 212, a sensor, or other component of the mobile device 202. If the temperature of the battery 212 is less than or equal to n° C., then the throttle enable voltage level can be set to Voltage_1. It should be noted that any of the voltage values provided in table 1000 or table 1002 can be set to any voltage value suitable for protecting components of the mobile device 202 from damage caused by a lack of power. In some embodiments, the throttle enable voltage level of the mobile device 202 increases as the temperature and the state of charge decreases.

FIG. 10B illustrates the table 1002, includes voltage values (V) for setting the throttle enable voltage level based on state of charge and temperature. For example, when the state of charge of the battery 212 is between 90% and 100%, and the temperature of the battery 212 is greater than or equal to 15, the throttle enable voltage level of the mobile device 202 can be set to x3 volts (V). In this way, a component or system of the mobile device 202 can be throttled when a voltage of the battery falls below the throttle enable voltage level corresponding to a current temperature of the battery 212. It should be noted that the values x1, x2, and x3 of FIG. 10B can be any voltage value suitable for a setting throttling threshold value. Furthermore, the throttle enable voltage levels can be used by a throttler or power throttling component 218 of the mobile device 202 to throttle the CPU 206, GPU 208, and/or any other power consuming component of the mobile device 202. By altering the throttle enable voltage levels based on state of charge and temperature, impedance of the battery can be accounted for in order to provide more accurate throttle enable voltage levels.

It should be noted that the throttling scenarios provided in table 1000 and table 1002 can be combined with any of the throttling scenarios discussed herein and provided in FIGS. 3-9. For example, when a state of charge of the battery 212 is between 90% and 100%, and a temperature of the battery 212 is below 5° C., the throttle enable voltage level can be set to x3 volts, as provided in FIG. 10B. Thereafter, when a voltage of the battery 212 is below x3 volts, throttling scenario 4 of FIG. 6 can be executed. Specifically, the throttling criteria of FIG. 6 corresponding to a temperature of less than 5° C. can be executed, thereby limiting the backlight 210 brightness and the performance states of the CPU 206 and the GPU 208 accordingly. In yet another example, when a state of charge of the battery 212 is between 0 and 5% and the temperature of the battery is between 5 and 10° C., the throttle enable voltage level can be set to x1 volts, as provided in FIG. 10B. Thereafter, when a voltage of the battery 212 is below x1 volts, throttling scenario 2 of FIG. 4 can be executed. Specifically, the throttling criteria of FIG. 4 corresponding to a temperature of between 5 and 10° C. and a battery state of charge between 0 and 50% can be executed, thereby limiting the backlight 210 brightness, and, when the camera 204 is on, limiting the performance states of the CPU 206 and the GPU 208 accordingly. The aforementioned examples are merely to illustrate certain combinations of scenarios for power throttling and further emphasize that numerous other combinations of throttling scenarios can be provided in view of this disclosure.

Figure 11:
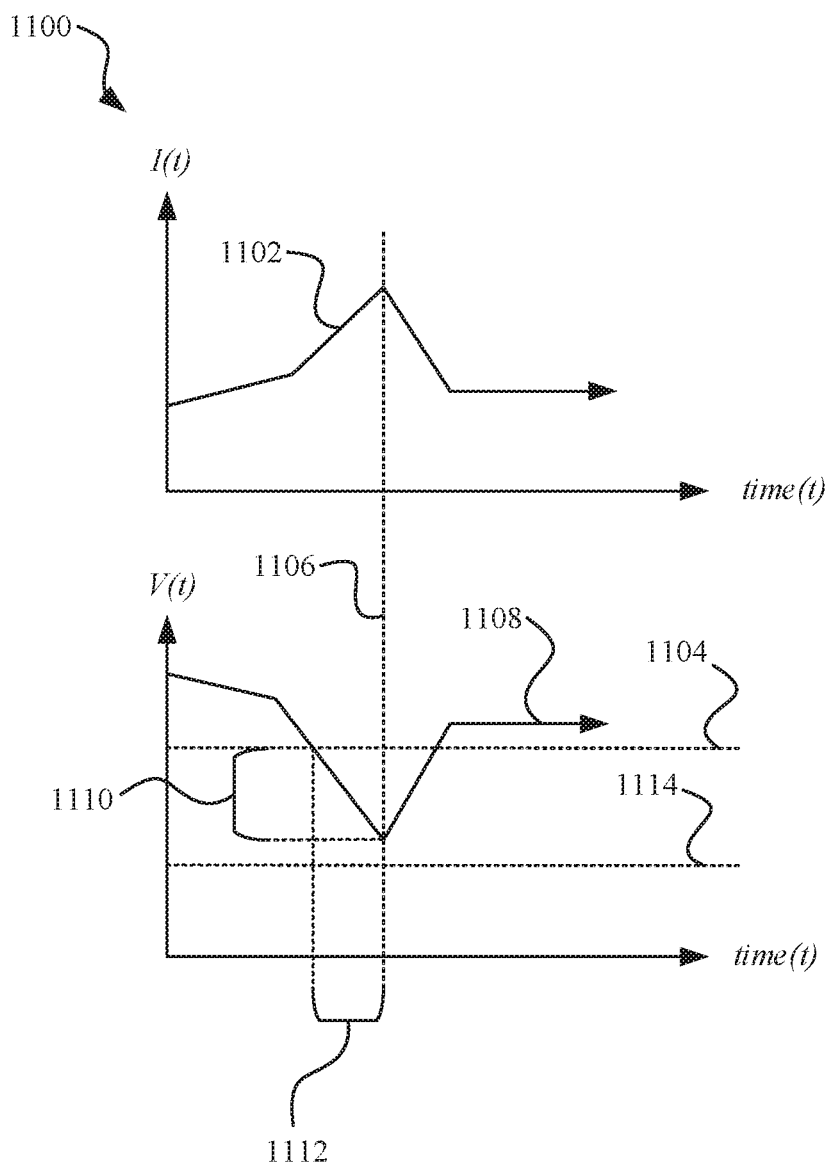
FIG. 11 illustrates plots of an example of enabling a throttler of a mobile device when a battery voltage falls to or below a throttle enable voltage level.

FIG. 11 illustrates plots 1100 of an example of enabling the throttler of the mobile device 202 when the battery voltage falls to or below a throttle enable voltage level 1104. When a component or subsystem of the mobile device 202 demands more current 1102 ("I(t)"), the current 1102 will increase and the voltage 1108 will decrease, as illustrated in plots 1100, before time 1106. Once the voltage 1108 ("V(t)") reaches or falls below the throttle enable voltage level 1104, there can be a delay in detecting that the voltage 1108 reached or fell below the throttle enable voltage level. As a result, a voltage difference 1110 and a time difference 1112 can be exhibited during the detection process and can be accounted for when setting the throttle enable voltage level 1104. When battery impedance is high as a result of a temperature change of the battery 212, the voltage difference 1110 will be greater and can be accounted for using the tables discussed herein. For example, the throttle enable voltage level 1104 can be set such that, by the time the throttler has been enabled at time 1106, the voltage 1108 would not have had enough time to fall to or below a shutdown voltage level 1114. Once the throttler has been enabled at time 1106, the current 1102 can decrease and the voltage 1108 can increase at least until the voltage 1108 reaches or exceeds the throttle enable voltage level 1104. Once the voltage 1108 has reached or exceeded the throttle enable voltage level 1104, the throttler can be disabled. It should be noted that the throttler can refer to the power throttling component 218, or one or more internal dividers of a CPU 206 and/or GPU 208 of the mobile device 202 that reduce the speed of the operating clock of the CPU 206 and/or GPU 208 when the throttler is enabled. Additionally, the throttler can control the throttling of other components, in addition to the CPU 206 and/or GPU 208, using any of the throttling criteria discussed herein.

Figure 12:
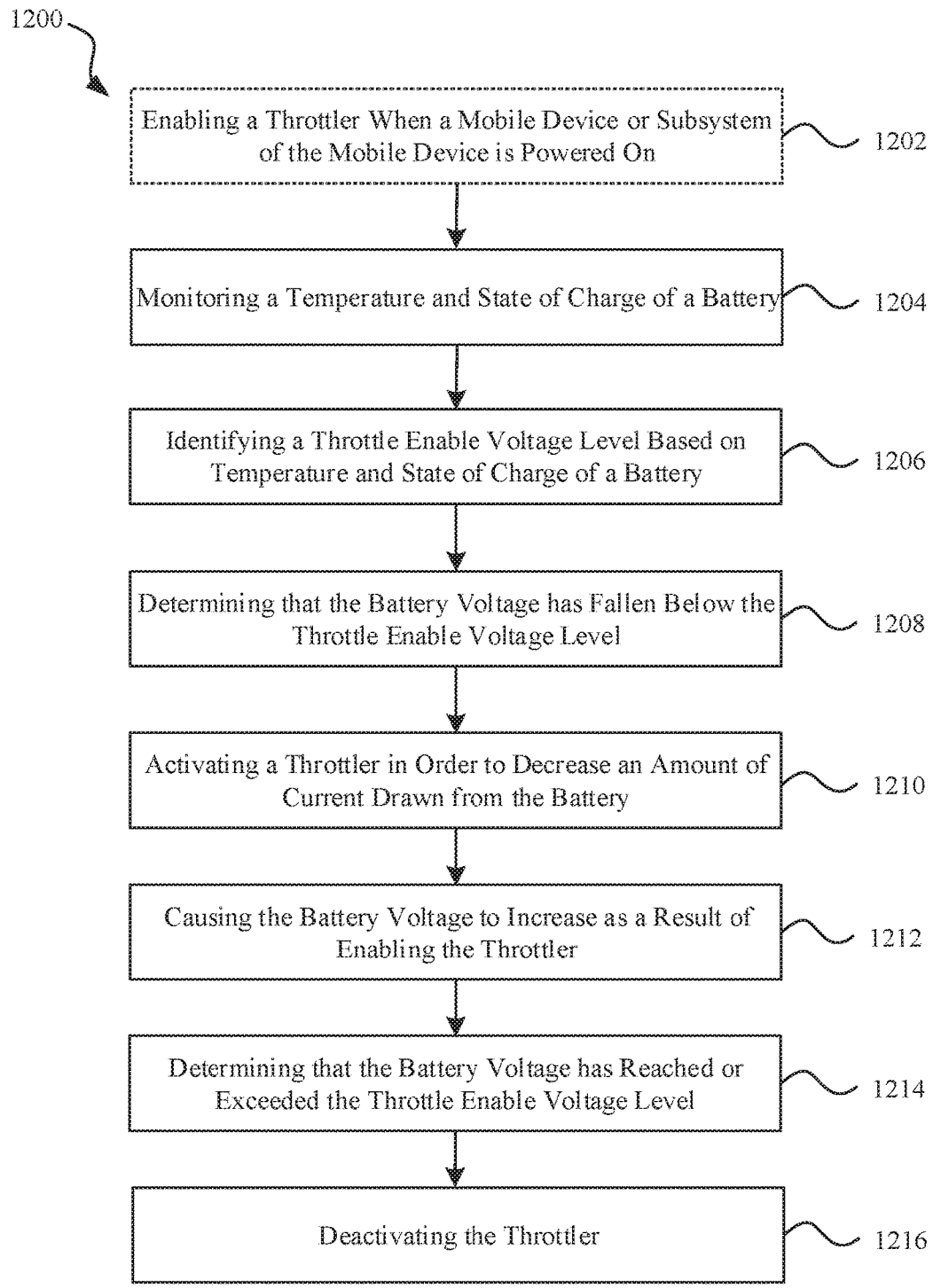
FIG. 12 illustrates a method for controlling the operation of the throttler discussed herein.

FIG. 12 illustrates a method 1200 for controlling the operation of the throttler discussed herein. Method 1200 can be performed by the CPU 206 and/or GPU 208 of the mobile 202, a power managing device of the mobile device 202, or any other component of the mobile device 202 suitable for activating and deactivating the throttler discussed herein. The method 1200 can include an optional initial step 1202 of enabling a throttler when a mobile device or subsystem of the mobile device is powered on. At step 1204 of method 1200, a temperature and state of charge of a battery can be monitored. At step 1206, a throttle enable voltage level can be identified based on temperature and state of charge of the battery 212 of the mobile device 202. The method 1200 can further include a step 1208 of determining that the battery voltage has fallen below the throttle enable voltage level. The throttle enable voltage level can be any suitable value, and can be based on the state of charge of the battery 212 and/or the temperature of the battery 212, as discussed herein. For example, as provided in FIG. 10B, the throttle enable voltage level can be x3 volts when the state of charge of the battery 212 is between 25% and 50%, and the temperature of the battery 212 or mobile device 202 is between 10° C. and 15° C. At step 1210, the throttler is activated in order to decrease an amount of current drawn from the battery 212 of the mobile device 202. At step 1212, the battery voltage is caused to increase as a result of enabling the throttler. The method 1200 can further include a step 1214 of determining that the battery voltage level has reached or exceeded the throttle enable voltage level. At step 1216, the throttler is deactivated in response to the battery voltage level reaching or exceeding the throttle enable voltage level. It should be noted that method 1200 can be modified to include features of any of the embodiments discussed herein.

It should be understood that the various aspects, embodiments, implementations or features of the described embodiments can be used separately or in any combination. Various aspects of the described embodiments can be implemented by software, hardware or a combination of hardware and software. The described embodiments can also be embodied as computer-executable code/instructions that can be stored on a non-transitory computer-readable medium. The non-transitory computer-readable medium can be any data storage device that can store data, which can thereafter be read by a computer system. Examples of such a computer-readable medium include a read-only memory (ROM), a random-access memory (RAM), a Flash memory, or another common type of storage device.

The foregoing description, for purposes of explanation, used specific nomenclature to provide a comprehensive understanding of the described embodiments. However, it should be apparent to one skilled in the art that all of the specific details are not required in order to practice the described embodiments. Thus, the foregoing descriptions of specific embodiments are presented for purposes of illustration and description. They are not intended to be exhaustive, or to limit the described embodiments to the precise forms disclosed. It will be apparent to one of ordinary skill in the art that many modifications and variations are possible in view of the above teachings.

What is claimed is:

1. A method, comprising:
at an electronic device:
obtaining, using a temperature sensor, a temperature at the electronic device;
determining whether the temperature is at or below a low-temperature threshold;
upon a determination that the temperature is at or below the low-temperature threshold, setting a battery threshold voltage to a first value;
when a voltage of the battery is below the first value, determining whether the electronic device is capturing video content using a camera component; and
in accordance with a determination that the device is capturing video content and the temperature is at or below the low-temperature threshold, reducing a power consumption of the electronic device.

2. The method of claim 1, further comprising: in accordance with a determination that the temperature is above the low-temperature threshold or that the device is not capturing video content, forgoing the reducing the power consumption of the electronic device.

3. The method of claim 1, wherein the reducing the power consumption of the electronic device comprises reducing a brightness of a display screen of the electronic device.

4. The method of claim 1, wherein the reducing the power consumption of the electronic device comprises reducing a clock rate of a central processing unit of the electronic device.

5. The method of claim 1, wherein the reducing power consumption comprises reducing a clock rate of a graphics processing unit of the electronic device.

6. The method of claim 1, wherein capturing video content comprises operating the camera component in an image burst mode.

7. The method of claim 1, wherein capturing video content comprises operating the camera component in a video mode.

8. The method of claim 1, wherein capturing video content comprises operating the camera component in a still image capture mode.

9. The method of claim 1, wherein the electronic device is a wearable device.

10. The method of claim 1, wherein the reducing power consumption comprises throttling a haptic feedback device, a speaker, a wireless transceiver, or a graphics processing unit.

11. An electronic device, comprising:
a temperature sensor;
a battery;
a central processing unit;
a camera component;
one or more processors, the one or more processors configured to:
obtain, using a temperature sensor, a temperature at the electronic device, determine the temperature is at or below a low-temperature threshold, set a battery threshold voltage to a first value, when the voltage of the battery is below the first value, determine whether the electronic device is capturing video content using a camera component, and in accordance with a determination that the device is capturing video content and the voltage of the battery is below the first value, reduce a power consumption of the electronic device.

12. The electronic device of claim 11, wherein the electronic device is a wearable device.

13. The electronic device of claim 11, further comprising:
a display screen, wherein the one or more processors are further configured to reduce the power consumption of the electronic device by reducing a brightness of a display screen.

14. The electronic device of claim 11, wherein the one or more processors are further configured to reduce the power consumption of the electronic device by reducing a clock rate of the central processing unit.

15. The electronic device of claim 11, further comprising:
a graphics processing unit, wherein the one or more processors are further configured to reduce the power consumption of the electronic device by reducing a clock rate of the graphics processing unit.

16. An electronic device, comprising:
a camera component;
a temperature sensor;
a first subsystem;
a battery; and
one or more processors operatively coupled to the camera, the temperature sensor, the first subsystem, and the battery, the one or more processors configured to:
obtain, using the temperature sensor, a temperature at the electronic device;
when the obtained temperature is at or below a threshold temperature:
set a battery threshold variable to a first value,
when a voltage of the battery is below the first value:
determine whether the camera is operating,
when the camera is operating:
throttle the camera or the first subsystem.

17. The electronic device of claim 16, wherein the first subsystem comprises a haptic feedback device.

18. The electronic device of claim 16, wherein the first subsystem comprises a speaker.

19. The electronic device of claim 16, wherein the first subsystem comprises a wireless transceiver.

20. The electronic device of claim 16, wherein the first subsystem comprises a graphics processing unit.

* * * * *